United States Patent [19]

Beissbarth

[11] Patent Number: 4,860,457
[45] Date of Patent: Aug. 29, 1989

[54] APPARATUS FOR MEASURING THE STEERING ANGLE OF A STEERABLE WHEEL OF A VEHICLE

[76] Inventor: Osmond Beissbarth, Sulzbacher Strasse 15, D-8000 Muenchen 40, Fed. Rep. of Germany

[21] Appl. No.: 133,300

[22] Filed: Dec. 15, 1987

[30] Foreign Application Priority Data

Dec. 15, 1986 [EP] European Pat. Off. ........ 86117436.5

[51] Int. Cl.$^4$ .................... G01B 5/255; G01B 7/315
[52] U.S. Cl. .............................. 33/203.18; 33/203.15
[58] Field of Search ................. 33/1 N, 1 PT, 203.15, 33/203.16, 203.17, 203.18, 203.19, 203.20, 288

[56] References Cited

U.S. PATENT DOCUMENTS

| | | |
|---|---|---|
| 1,840,766 | 1/1932 | Creagmile . |
| 3,164,910 | 1/1965 | Manlove ........................ 33/203.18 |
| 4,236,315 | 12/1980 | Curchod et al. ................. 33/203.18 |
| 4,341,021 | 7/1982 | Beissbarth ....................... 33/203.18 |
| 4,394,798 | 7/1983 | Beissbarth ....................... 33/203.18 |
| 4,429,467 | 2/1984 | Murata et al. .................... 33/203.15 |
| 4,481,716 | 11/1984 | Beissbarth ....................... 33/203.18 |

FOREIGN PATENT DOCUMENTS

| | | |
|---|---|---|
| 0189721 | 8/1986 | European Pat. Off. . |
| 2650577 | 5/1978 | Fed. Rep. of Germany . |
| 3608424 | 9/1987 | Fed. Rep. of Germany ... 33/203.18 |

Primary Examiner—William A. Cuchlinski, Jr.
Assistant Examiner—Patrick R. Scanlon
Attorney, Agent, or Firm—Birch, Stewart, Kolasch & Birch

[57] ABSTRACT

An apparatus for measuring the steering angle of a steerable vehicle wheel comprises first and second electric angle measurement instruments interconnected by an elastic tensile member and electronic circuitry connected to the angle measurement instruments. The first angle measurement instrument is attached to the wheel by a pivotal measuring arm at a generally perpendicular axis to the wheel. The second angle measurement instrument is attached to a measuring base by a pivotal measuring arm and is arranged approximately along the axis of rotation of the wheel. The electronic circuitry receives signals issued by the angle measurement instruments and processes these signals to generate a steering angle signal. A display device is provided and is connected to the electronic circuitry. The apparatus can also be used to measure the track differential angle for each steerable wheel of the vehicle.

10 Claims, 4 Drawing Sheets

APPARATUS FOR MEASURING THE STEERING ANGLE OF A STEERABLE WHEEL OF A VEHICLE

BACKGROUND OF THE INVENTION

The invention relates to an apparatus for measuring the steering angle of a steerable wheel of a vehicle.

In order to determine the castor, the kingpin inclination and the track differential angle in a vehicle it is necessary to measure the steering angle of the steerable wheels of said vehicle. The castor is understood to be the inclination of the kingpin and/or the wheel leg axis, respectively, as compared to an imaginative perpendicular line intersecting the center of the wheel. The castor is calculated out of the changes in angles of the slope, i.e. of the angle of inclination of the wheels with respect to a perpendicular plane, between the steering angles of the wheels, at a wheel angle of 20 degrees of the left-hand wheel and a wheel steering of 20 degrees of the right-hand wheel. The kingpin inclination is understood to mean the angle at which the kingpin is inclined to the inside with respect to the line perpendicular to the transverse axis of the vehicle. The measurement of the kingpin inclination as well as that of the castor is effected at a wheel angle of 20 degrees to the left. The track differential angle is the angle between the curve-inner and the curve-outer wheel in a curve and it is measured at a steering of 20 degrees of the curve-inner wheel. For determining these parameters of the wheel suspension, it is thus necessary to measure the steering angle of the steerable wheels. Finally, the manufacturers of vehicles lately claim that the maximal steering which depends on the turning circle of a vehicle can also be measured.

For this purpose it must be possible to acquire an angle measuring range of up to 60 degrees.

From the West German patent publication 26 50 577 an apparatus is known for measuring the steering angle of steerable wheels, said apparatus comprising a reference portion to be fixed to the wheel and having a scale, and a pivoted arm being rotatably connected to the reference portion, rotatable about an axis being essentially vertical and being arranged independently from the summit of the wheel steering angle. Therein the scale at the reference portion and the pivoted arm are mutually shiftable and comprise oppositely arranged read-out devices for the pivot angle. At the reference portion, a parallel guidance is provided comprising a projector for generating a light beam, a mirror for reflecting said light beam and a screen at the projector, on which screen the reflected beam will impinge in case of a corresponding alignment of the projector and the mirror. Therein the projector is arranged on the pivoted arm, whereas the mirror is adjusted stationary with respect to the steering wheel. Said apparatus is comparatively expensive because the projector, cannot be easily handled for the required adjusting of the mirror and is not suitable for an electronical evaluation of the measurement results.

SUMMARY OF THE INVENTION

With respect thereto the present invention is based on the problem of creating a sturdy and simple to handle apparatus for measuring the steering angle of the steerable wheels of a vehicle, the use of which apparatus does not require a costly adjusting of the apparatus and which nevertheless provides measurement signals suitable for electronic evaluation.

For solving this problem, the apparatus according to the present invention intended for the measurement of the steering angle of a steerable wheel of a vehicle is characterized by (a) a first electric angular measurement instrument with a measuring arm pivotal about an essentially vertical axis, said instrument being mountable to the steerable wheel, (b) a second electric angular measurement instrument with a measuring arm pivotal about an essentially vertical axis, which instrument is located at a measuring base to be arranged approximately in prolongation of the axis of rotation of the measurable wheel, (c) an elastic tensile member mutually connecting the two measuring arms, (d) an electronic circuitry connected to the electric measurement instruments, said circuitry using the angle signals issued by the electric measurement instruments together for generating a steering angle signal, and (e) a display means being connected to the electric circuitry, for the steering angle corresponding to the steering angle signal.

The handling of the apparatus in accordance with the present invention is extremely simple. First, the first electric angle measurement instrument is mounted at the steerable wheel by holding devices which are known in connection with other measurement instruments. At the beginning of the measurement, when the wheel of the vehicle is directed to "travel straight ahead", the measuring base is installed such that a basic line is formed between the axis of rotation of the angle measurement instrument at the wheel via the relating measuring arm, the biasing member, the measuring arm of the second angle measurement instrument and the axis of rotation of the second angle measurement instrument in the measuring base. This basic line should coincide with the direction of the axis of rotation of the wheel, i.e. should be rectangular with respect to the direction of travel of the wheel. It is, however, not necessary to exactly adjust the basic line to the direction of the axis of rotation of the wheel. If the wheel is now turned, the measurement instrument at the wheel will deviate from the basic line due to the radius of rolling and to the disposal at the outside of the wheel. The measuring arm is drawn in a direction of the axis of rotation of the measurement instrument in the measuring base by the tensile member. Simultaneously, the tension arm of the angle measurement instrument in the measuring base moves such that it is aligned with respect to the axis of rotation of the angle measurement instrument at the wheel. Thus, the output signal of the angle measurement instrument at the wheel includes a component representing the steering angle of the wheel as well as a component including the deviation of the angle measurement instrument from the basic line. The deviation of the angle measurement instrument at the wheel, however, is detected by the angle measurement instrument in the measuring base so that this deviation can be eliminated by balancing the values of the output signals of the two angle measurement instruments and the actual steering angle of the wheel can be detected. An exact adjustment of the measuring base to the prolongation of the axis of rotation of the wheel is not absolutely necessary since lateral deviations of the measuring base from the line of prolongation can be eliminated by balancing the output signals of the angle measurement instruments.

In a preferred embodiment of the apparatus according to the present invention, each of the angle measurement instruments is supported such that they are pivotable about an horizontal axis being essentially vertical with respect to the prolongation of the axis of rotation of the wheel. In this embodiment, the angle measurement instruments may be located at different heights from the ground, i.e. differences in height of the angle measurement instruments can be compensated. Therefore, the apparatus according to the present invention is suitable for use with wheels of different sizes without constructional changes to the apparatus.

A further advantageous embodiment of the apparatus according to the present invention consists of the angle measurement instruments being so-called incremental angle indicators. This means that the angle measurement instruments are measuring devices of equal construction and they issue output signals only representing the value of change of angle during the measurement. Suh inremental angle indicators have no absolute zero mark, but issue only such values as output signal, resulting from the angular movement from the beginning of measurement up to the end of the wheel steering. Therefore, when such angle indicators are used, also a twisting of the measuring base about a vertical line with respect to the basic line does not affect the measurement so that an exact alignment of the measuring base itself is not necessary.

According to a simple embodiment of the apparatus according to the present invention, the electronic circuitry is a subtraction circuitry subtracting the absolute values of the output signals of the angle measurement instruments or the outputs of the incremental angle indicators from one another.

Making use of the apparatus of the present invention or the preferred embodiment thereof, it is easy to build an apparatus for measuring the track differential angle of the steerable wheels of a vehicle, such apparatus comprising one of such instruments for each steerable wheel. Therein, it will be advantageous to provide for an additional electronic circuitry in which the steering angle signals representing the steering angles of the steerable wheels of a pair of wheels are processed for generating a track differential signal, and a display device being connected to the additional circuitry, for the track differential angle corresponding to the track differential angle signal. Thereby, it will no longer be necessary to read out the individual steering angles for the left and the right steerable wheels and to calculate separately. Futhermore, the track differential angle may be directly fed to an evaluation means in which the measuring results are recorded or printed.

Finally, it is advantageous when the display means are located in a housing separate from the angle measurement instrument at the wheel and from the measuring base. Therein, the display device may be disposed such that the operating person when steering the wheels can observe at the same time to which extent the steering has been effected.

Further scope of applicability of the present invention will become apparent from the detailed description given hereinafter. However, it should be understood that the detailed desription and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed desription given hereinbelow and the accompanying drawings which are given by way of illustration only, and thus, are not limitative of the present invention, and wherein.

DETAILED ACCOUNT OF WORKING EXAMPLE OF THE INVENTION

Figure 1:
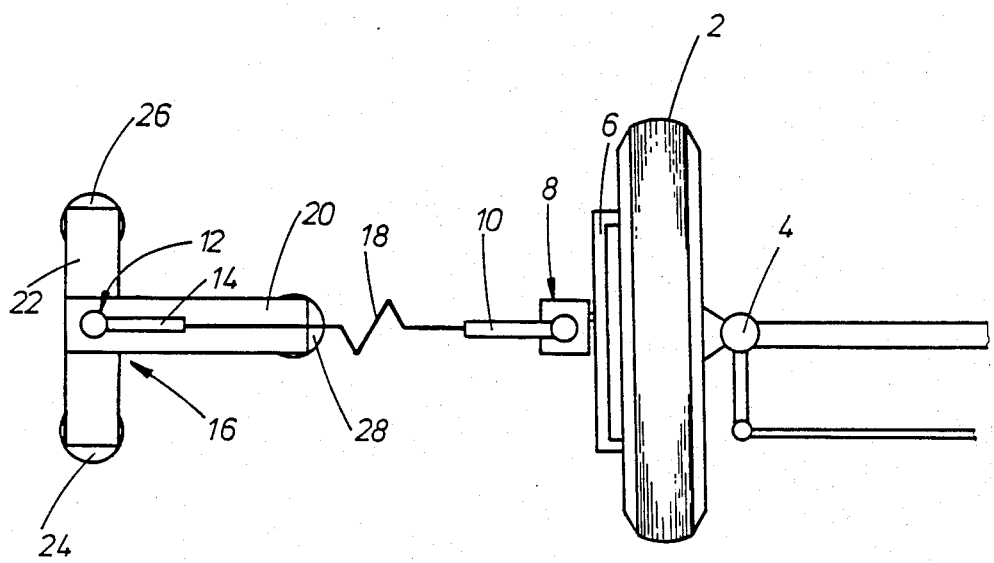
FIG. 1 is a schematic representation of the main parts of the apparatus according to the present invention.
Figure 2:
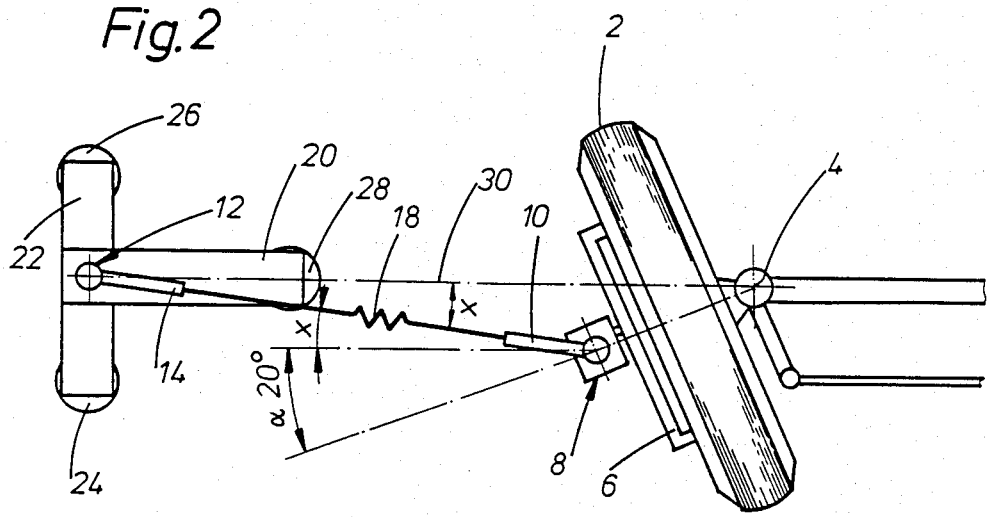
FIG. 2 is a top view according to FIG. 1 with steered wheel.

FIG. 1 shows an apparatus for measuring the steering angle of a steerable wheel 2 of a vehicle, wherein the wheel suspension with the kingpin is also shown schematically. At the outside of the wheel rim a mounting device 6 is fixed thereto, which device may be a commonly used measurement instrument holding means with a special adaptation which will be described hereinafter. A first electric angular measurement instrument 8 with a measuring arm 10 pivotable about an essentially vertical axis is mounted at the wheel 2 with the aid of the mounting device 6. A second electric angular measurement instrument 12 with a measuring arm 14 pivotable about an essentially vertical axis is arranged at a measuring base 16 and the measuring arms 10, 14 of the two angular measurement instruments 8, 12 are mutually connected by means of an elastic tensile member 18. In FIGS. 1 and 2, the measuring base 16 is shown in partly broken-away view to be able to schematically show the arrangement of the angular measurement instrument 12 in the measuring base 16. The measuring base 16 has an elongated base plate 20 and a cross girder 22 as well as legs 24, 26, 28, by means of which legs it is put on the ground.

With reference to FIG. 2, the operating mode of the apparatus is described with a 20° steering angle $\alpha$ of the wheel 2 being shown. In this position, the angular measuring instrument 8 shows a lateral deviation from the base line 30 as the wheel 8 moves on the radius of rolling during the steering of the wheel. The center point of the radius is located at the kingpin 4. The angle signal issued by the angular measurement instrument 8 therefore corresponds to the angle $(\alpha+x)$. On the other hand, the output signal of the angular measurement instrument 12 corresponds to the angle of deflection x. Therefore, the angle $\alpha$ can be obtained by means of a simple subtraction of the two output signals of the angular measurement instruments 8 and 12. It can also be seen from this representation that an exact alignment of the measuring base on the base line 30 at the beginning of the measurement is not required. When the measuring base is adjusted such that the longitudinal central axis of the base plate 20 is laterally displaced in parallel with respect to the base line 30, the angle x and thus, the output signal of the angular measurement instrument 12 or the respective portion of the output signal of the angular measurement instrument 8, each, will be enlarged by the same amount so that the angle α will be found when the output signals of the two angle indicators 8, 12 are processed. When the base plate 20 shows such misalignment with respect to the base line 30 that the base plate 20 forms an angle with the base line 30, i.e. when the measuring base 16 is twisted, the measuring arm 14 shows an angle with respect to the base line 30, whereas the measuring arm 10 lies on the base line. Such a misalignment of the measuring base 16 principally has to be taken account of—when using three-phase potentiometers as angle measuring devices—e.g. in the electronic circuitry in that the initial deviation of the angle measurement instrument 12 is stored and is taken into account in the calculation of the angle α.

Incremental angle indicators can be used as an angle measurement instruments, having no absolute zero mark but only measuring the deviation between an initial and a final position. Such incremental angle indicators work on the basis of optic scanning and translate the angular position of the appliance shaft into digital signals which can be tapped at the output terminal. The electric output signals of said incremental angle indicators are fed to an electronic circuitry and are subjected to a subtraction operation to obtain the angle α.

Figure 3:
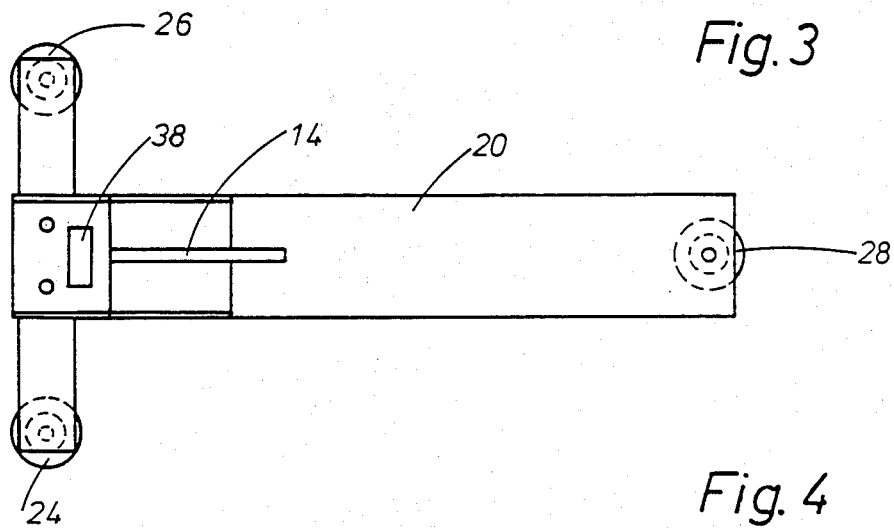
FIG. 3 is an enlarged top view of the measuring base.
Figure 4:
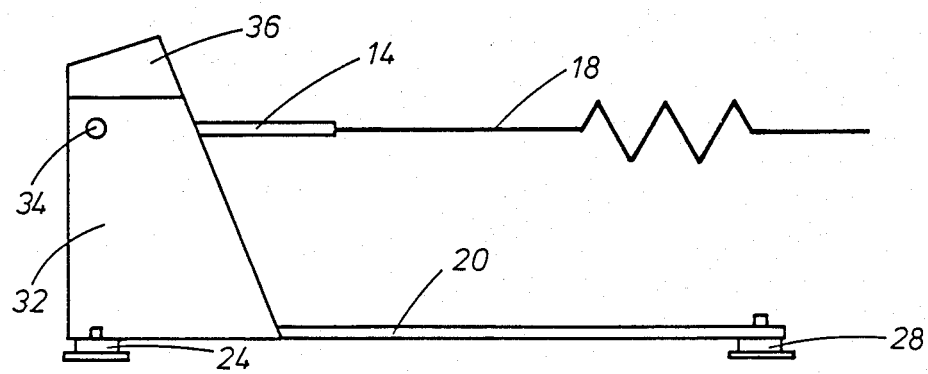
FIG. 4 is a side view of the measuring base.

FIGS. 3 and 4 show enlarged views and/or side views of the measuring base 16. A housing 32 in which the angular measurement instrument 12 with the measuring arm 14 is arranged on the base plate 20. The angle measurement instrument is pivotally mounted on a horizontal axis 34 being essentially perpendicular to the base line 30. Thus, the angle measurement instrument 12 can adjust itself to the height level of the angle measurement instrument 8, even if the angle measurement instrument 8 is arranged at a higher or lower position than the angle measurement instrument 12, which may be the case e.g. when measuring wheels of different sizes. On the casing 32 of the measuring base 16, a knee 36 is provided comprising the electric circuitry and a display device 38. Display device 38 can be a numerical display unit.

Furthermore, the knee 36 includes switches for switching the apparatus ON or OFF as well as for clearing the display. The electric lines between the angle measurement instrument 8 and the electric circuitry, the electric circuitry itself and the supply lines for the apparatus are not shown for the sake of simplification.

Figure 5:
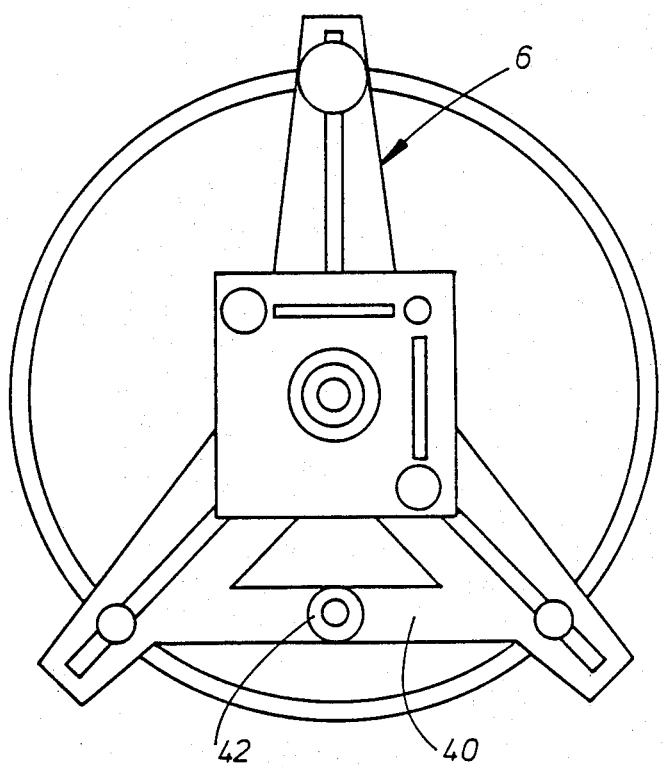
FIG. 5 is a side view of the holding device for the measuring instrument at the wheel.
Figure 6:
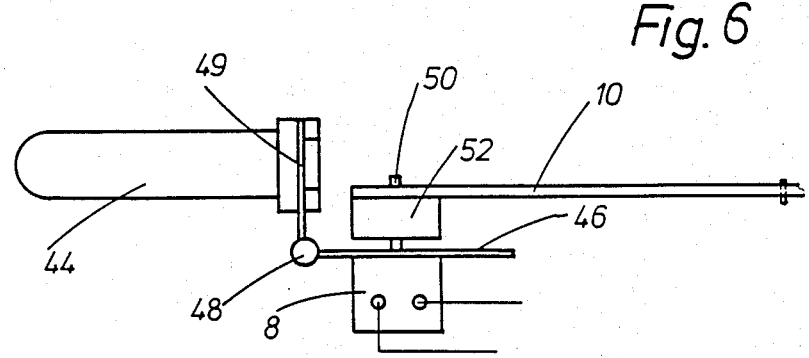
FIG. 6 is a side view of the part of the apparatus being mounted at the wheel.

FIG. 5 shows the lateral top view on a essentially known measurement instrument holding means serving as a mounting device 6 for the measurement instrument 8. The mounting device 6 is provided with a web 40 with a bore 42 into which a bolt 44 can be inserted. The angle measurement instrument 8 is mounted on a plate 46 which is connected to a further plate 49 being fixed to the bolt 44 by a hinge 48 and being pivotable about the horizontal axis of rotation of the wheel. The measuring arm 10 is fixed to the turning shaft 50 of the angle measurement instrument 8 by means of a mount 52. Due to the hinge 48, the angle measurement instrument 8 can adjust itself to a differing height level between the angle measurement instrument 8 and the angle measurement instrument 12.

The previously described apparatus allows the measurement of the steering angles of one individual steerable wheel and can therefore be used for measuring the castor, the spreading and the maximal steering angle of the steering. For the measurement of the track differential angle such instruments have to be provided for at both steerable wheels. The measurement of the steering angles is effected at both wheels in the above-described manner. For measuring the track differential angle, an additional electronic circuitry may be provided in which the steering angle signals representing the steering angles of the steerable wheels of a pair of wheels, are processed for generating the track differential angle signal and an additional display means being connected to the additional circuitry, for the track differential angle corresponding to the track differential angle signal.

Figure 7:
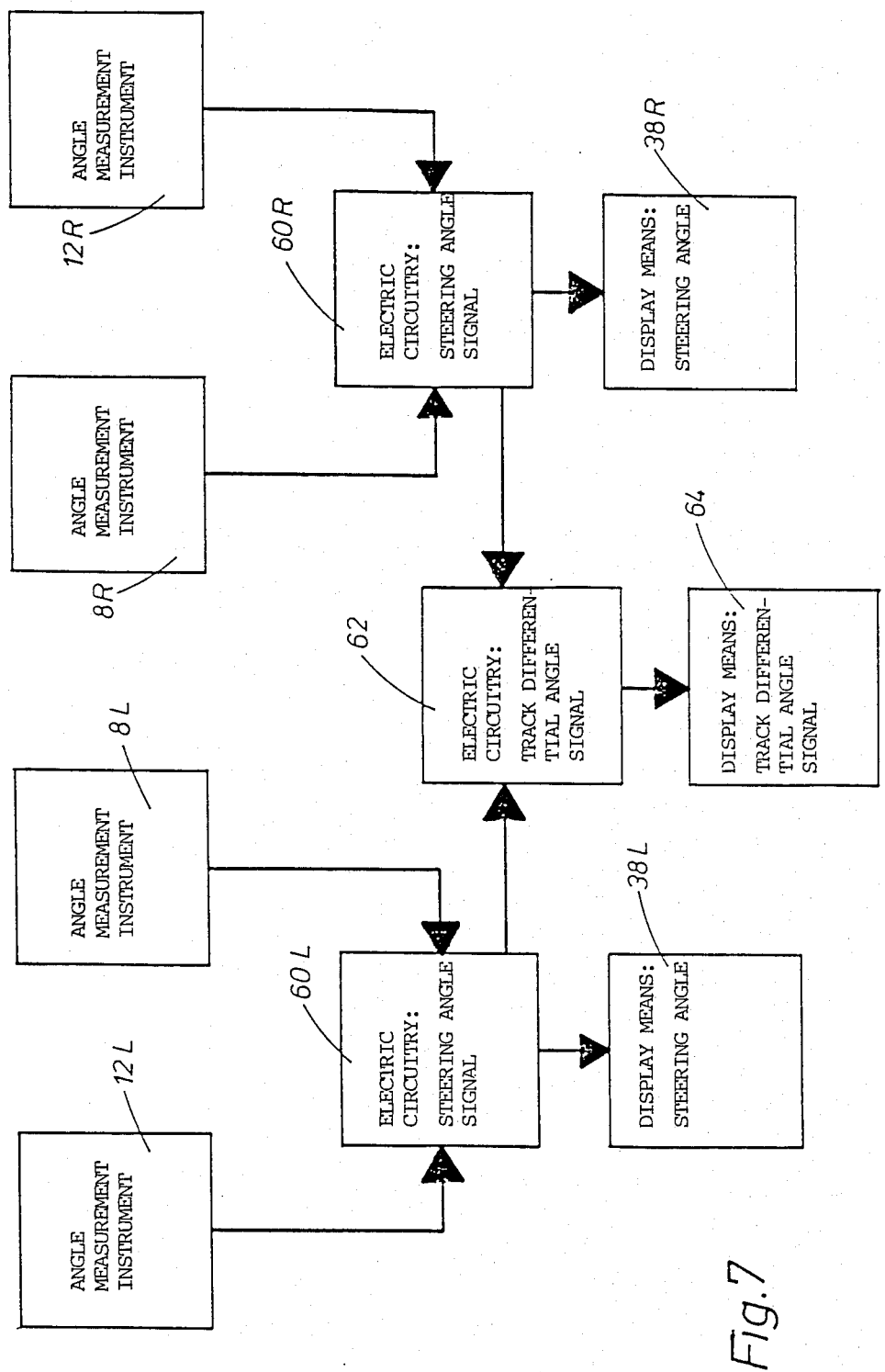
FIG. 7 is a block diagram of the individual components of the apparatus.

FIG. 7 shows a schematic block view of the apparatus for measuring the track differential angle, wherein the instrument for measuring the steering angle of the right-side steerable wheel is referred to with the above-used reference numbers adding the letter "R". For the left-side steerable wheel an "L" is used. The output signals of the angle measurement instruments 8L, 12L, are fed to the electronic circuitry 60L generating the steering angle signal and supplying it to the display means 38L for displaying the steering angle. Correspondingly, the output signals of the angle measurement instruments 8R, 12R are fed to the circuitry 60R and from there are supplied to the display means 38R. The output signals of the circuitry 60L, 60R reach the circuitry 62 in which the track differential angle signal is calculated as difference from the steering angle signals issued by the circuitry 60L, 60R. The track differential angle signal is supplied to the display means 64 and displayed as the differential angle.

As has been described above, in the most simple embodiment of the apparatus, the circuitry 60L, 60R and the display means 38L, 38R are located in the respective measuring base. As can be seen from FIG. 7, it is also possible to arrange the display means 38L, 38R and 64 as well as the electric circuitry 62 in a casing being separated from the first angle measurement instrument 12L, 12R and the measuring base 16, or in a so-called pilot unit. Such a pilot unit can be positioned by the service person in such a way that he or she can observe the unit during steering. The operating person can carry out the required measurements without laving his or her place behind the steering wheel. The different display indications can also be offered to the service person on a large-scale display unit or a screen thus enabling the service person to carry out the measurements without leaving the seat behind the steering wheel.

The invention being thus described, it will be obvious that the same may be varied in many ways. Suh variations are not to be regarded as a departure from the spirit and scope of the invention, and all such modifications as would be obvious to one skilled in the art are intended to be included within the scope of the following claims.

What is claimed:

1. An apparatus for measuring the steering angle of a steerable wheel of a vehicle comprising:
   (a) a first electric angle measurement instrument with a measuring arm pivotable about a generally vertical axis, said first instrument being fixed to the steerable wheel;
   (b) a second electric angle measurement instrument with a measuring arm pivotable about a generally vertical axis, the second instrument being mounted at a measuring base which is positioned generally along an axis of rotation of the wheel;

(c) an elastic tensile member mutually connecting the two measuring arms;

(d) electronic circuitry means connected to the angle measurement instruments for processing angle signals issued by the angle measurement instruments and for generating a steering angle signal; and (e) display means connected to the electronic circuitry means for displaying the steering angle corresponding to the steering angle signal.

2. The apparatus according to claim 1, wherein both of the angle measurement instruments are supported pivotally about an axis being horizontal and generally perpendicular to the axis of rotation of the wheel.

3. The apparatus according to claim 1, wherein the angle measurement instruments are incremental angle indicators.

4. The apparatus according to claim 2, wherein the angle measurement instruments are incremental angle indicators.

5. The apparatus according to claim 1, wherein the electronic circuitry means comprises a subtraction circuit.

6. The apparatus according to claim 1, wherein the display means comprises a numerical indicator.

7. The apparatus according to claim 1, wherein the electronic circuitry means and the display means are arranged in the measuring base.

8. An apparatus for measuring track differential angle of steerable wheels of a vehicle comprising one apparatus for measuring the steering angle for each steerable wheel, wherein each apparatus for measuring the steering angle comprises:

(a) a first electric angle measurement instrument with a measuring arm pivotable about a generally vertical axis, said first instrument being fixed to the steerable wheel;

(b) a second electric angle measurement instrument with a measuring arm pivotable about a generally vertical axis, the second instrument being mounted at a measuring base which is positioned generally along an axis of rotation of the wheel;

(c) an elastic tensile member mutually connecting the two measuring arms;

(d) electronic circuitry means connected to the angle measurement instruments for processing angle signals issued by the angle measurement instruments and for generating a steering angle signal; and (e) display means connected to the electronic circuitry means for displaying the steering angle corresponding to the steering angle signal.

9. The apparatus according to claim 8, further comprising second electronic circuitry means for processing the steering angles of the steerable wheels of a pair of wheels and for generating a track differential angle signal, and further comprising additional display means connected to the second electronic circuitry means for displaying the track differential angle corresponding to the track differential angle signal.

10. The apparatus according to claim 1, wherein the display means is arranged in a housing separate from the first angle measurement instrument and the measuring base.

* * * * *